Nov. 28, 1944. C. F. ZIPPER 2,363,769
ROTARY CUTTING DISK
Filed June 26, 1942
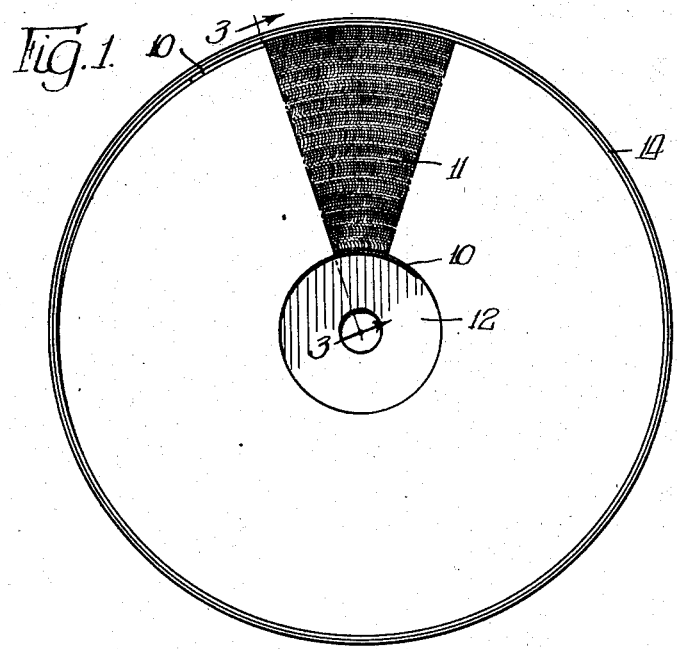
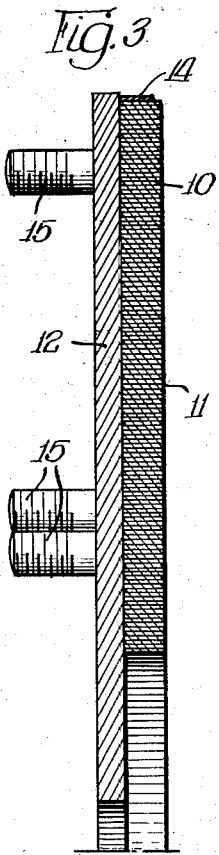
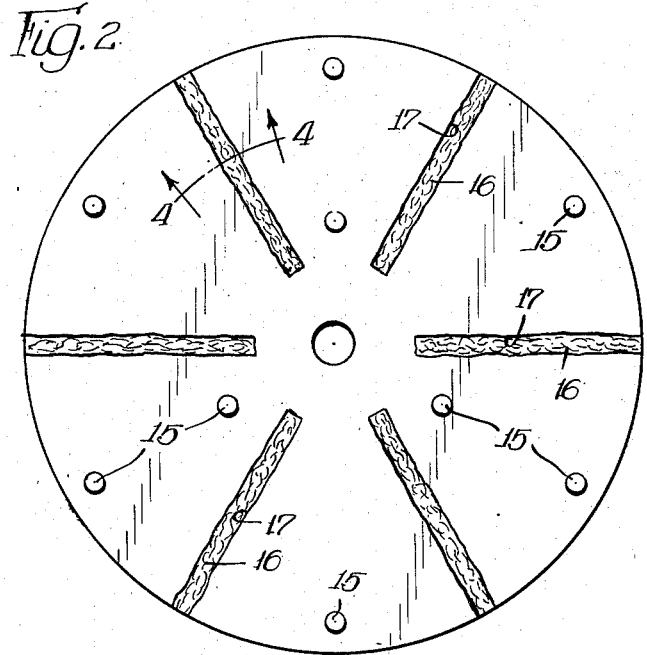
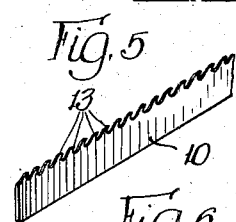
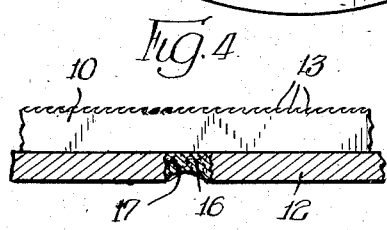
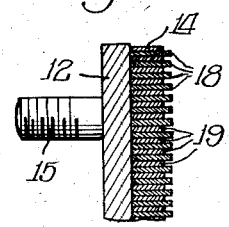
INVENTOR.
Charles F. Zipper,
BY Cromwell, Grist + Warden
attys.

Patented Nov. 28, 1944

2,363,769

UNITED STATES PATENT OFFICE 2,363,769

ROTARY CUTTING DISK

Charles F. Zipper, Des Plaines, Ill., assignor to Albert G. Mather, Chicago, Ill.

Application June 26, 1942, Serial No. 448,572

3 Claims. (Cl. 29—78)

The object of this invention is to provide an improved cutting device for use in reducing various solid materials to a powder, flake or granular form.

The improved device is a rotary disk-like member which has a circumferentially continuous cutting face of considerable radial extent produced by the toothed edge of a long thin metal saw band wound into a tight spiral coil.

Although of general utility as a cutting implement, the improved device has been found to be especially advantageous in the reduction of such materials as magnesium and aluminum because of the high speed with which it can accomplish the desired reduction and the great quantities of metal it can reduce before evidencing any appreciable wear.

The device can be used alone, or it can be installed in practically any type of cutting, grinding or abrading machine designed for the reception of a rotary work-engaging implement.

While the foregoing statements are indicative in a general way of the nature of the invention, other more specific objects and advantages will be apparent to those skilled in the art upon a full understanding of the improved device.

A preferred embodiment of the invention and one modified form are presented herein for the purpose of exemplification, but it will of course be appreciated that the invention may be incorporated in various other structurally modified forms coming equally within the scope of the appended claims.

In the accompanying drawing:

Fig. 1 is a face view of the new device;

Fig. 2 is a rear view of the same;

Fig. 3 is a radial section, taken on the line 3—3 of Fig. 1;

Fig. 4 is an arcuate section, taken on the line 4—4 of Fig. 2;

Fig. 5 is a perspective view of a short length of the saw band used in making up the device; and Fig. 6 is a fragmentary radial section (corresponding to a portion of Fig. 3) through the outer periphery of a modified disk structure.

The disk structure shown in Figs. 1 to 5 inclusive will first be described. This structure is characterized by a long thin saw band 10 which is wound into a tight spiral coil 11 and is attached to the front face of a backing plate 12. The band 10 is provided with sharp teeth 13 which are preferably of such shape as to give a cutting as distinguished from abrasive action. The coil 11 is positioned flatly against the plate 12 and preferably covers the greater part of the surface of the plate, extending radially from a point near the center of the plate to the outer periphery of the latter. The outermost loop of the coil 11 is preferably confined within a tightly fitting hoop 14 which, like the coil 11, is welded to the plate. The plate 12 is adapted to be rigidly mounted upon a rotary driving member by any suitable fastening means, such as the screw-threaded attaching studs 15. The coil 11 is welded to the plate 12 along radial lines by weld deposits 16 which are located in radial slots 17 formed in the plate. The hoop 14 reinforces the outer edge of the cutting face of the disk. In addition, during the construction of the disk, the hoop may serve to hold the band 10 in its tightly rolled up condition while it is being welded to the plate 12.

With the teeth 13 of the band shaped as shown in Fig. 5, the metal which is being reduced will be cut off in minute shavings which will curl up in front of the teeth and be ejected therefrom by subsequently cut shavings, thus giving a self-cleaning action to the cutting face of the disk.

The band 10 is preferably about ⅜" wide by about .020" thick but may of course be of any desired width and thickness. The coil 11 and plate 12 are shown as flat, but it is conceivable that they could be given other shapes. While one way of welding the coil 11 to the plate 12 is shown, it will of course be understood that other ways of welding those parts together could be employed and that welding could be dispensed with and other means of connection resorted to.

In Fig. 6 of the drawing a modified disk structure is shown in which the teeth of adjoining loops of the saw band 18 are spaced apart in a direction radially of the disk through the employment of a plain spacing band 19. The plain band 19 is of less height than the saw band 18, and the two bands are wound up together to form the coil with the toothed edge of the saw band projecting beyond the corresponding edge of the plain band.

I claim:

1. A device of the character described, characterized by a long thin saw band which is provided with a toothed cutting edge and is wound into a tight spiral coil to present a circumferentially continuous cutting face of substantial radial extent, and a rotary backing plate to which the coil is attached, said plate being provided with openings, and said coil being welded to the plate through the openings.

2. A device of the character described, characterized by a long thin saw band which is provided with a toothed cutting edge and is wound into a tight spiral coil to present a circumferentially continuous cutting face of substantial radial extent, a hoop in which the coil is confined, and a rotary backing plate to which the coil is attached, said coil having its rear face positioned against and secured directly to the plate independently of the confining hoop.

3. A device of the character described, characterized by a long thin saw band which is provided with a toothed cutting edge and is wound into a tight spiral coil to present a circumferentially continuous cutting face of substantial radial extent, and a rotary backing plate to which the coil is welded through radial slots formed in the plate.

CHARLES F. ZIPPER.